US006445397B1

(12) United States Patent
Boyer

(10) Patent No.: US 6,445,397 B1
(45) Date of Patent: Sep. 3, 2002

(54) APPARATUS FOR GUIDING A VEHICLE ALLOWING A ROUTE SWEEP

(75) Inventor: Jean Philippe Boyer, Le Chesnay (FR)

(73) Assignee: Siemens Corporation (DE)

( * ) Notice: Subject to any disclaimer, the term of this patent is extended or adjusted under 35 U.S.C. 154(b) by 0 days.

(21) Appl. No.: 09/237,395

(22) Filed: Jan. 27, 1999

(51) Int. Cl.⁷ ............................................. G06F 13/00
(52) U.S. Cl. ...................................................... 345/667
(58) Field of Search ................................ 345/156, 160, 345/168, 169, 173, 682, 684, 660, 667; 340/990, 995, 998; 701/211

(56) References Cited

U.S. PATENT DOCUMENTS

| | | | |
|---|---|---|---|
| 5,270,936 A | * 12/1993 | Fukushima et al. | 364/444 |
| 5,652,706 A | *  7/1997 | Morimoto et al. | 364/449.4 |
| 5,689,423 A | * 11/1997 | Sawada | 364/444.2 |
| 5,757,359 A | *  5/1998 | Morimoto et al. | 345/156 |
| 5,848,373 A | * 12/1998 | DeLorne et al. | 701/200 |
| 5,913,918 A | *  6/1999 | Nakano et al. | 701/208 |
| 5,945,927 A | *  8/1999 | Nakayama et al. | 340/995 |
| 6,035,253 A | *  3/2000 | Hayashi et al. | 701/211 |
| 6,040,829 A | *  3/2000 | Croy et al. | 345/327 |
| 6,064,941 A | *  6/2000 | Nimura et al. | 701/210 |
| 6,163,752 A | * 12/2000 | Sievers et al. | 701/212 |
| 6,223,124 B1 | *  4/2001 | Matsuno et al. | 701/209 |

FOREIGN PATENT DOCUMENTS

| | | |
|---|---|---|
| DE | 19537255 A1 | 4/1996 |
| JP | 63073111 | 4/1988 |
| JP | 06331367 | 12/1994 |
| JP | 09062185 | 3/1997 |

* cited by examiner

*Primary Examiner*—Vijay Shakar
(74) *Attorney, Agent, or Firm*—Mayer, Brown, Rowe & Maw

(57) ABSTRACT

An apparatus for guiding a vehicle allowing a route sweep is disclosed. The apparatus includes a display which shows a portion of a map. The user may move the map on the display from a start point to a finish point. This movement is termed a route sweep. To carry out a route sweep allowing a user to take cognizance of a route proposed by the apparatus, the maximum rate of sweep of the map on a display screen, the so-called cruising rate (L), desirable to obtain a short sweep time, is first calculated. Then starting from a specified scale (R.S.), the map is moved at an increasing rate in such a way as to arrive at the cruising rate (L) after a predetermined time. Simultaneously, the scale (chain-dotted curve) is reduced so as to arrive after the same time at a scale which is compatible with the cruising rate. The central part of the sweep is then carried out at the cruising rate with compatible scale, and the sweep is terminated while reducing the rate and while enlarging the scale again so as to return to the initial scale.

10 Claims, 1 Drawing Sheet

APPARATUS FOR GUIDING A VEHICLE ALLOWING A ROUTE SWEEP

FIELD OF INVENTION

The present invention relates to an apparatus for guiding a vehicle, specifically a map display which scales the display according to the distance between a start point and a finish point.

BACKGROUND OF THE INVENTION

Presently, devices for guiding a vehicle, are provided with a display screen-on which can be displayed, among other things, a specified portion of a map, with an input and control unit among other things for choosing a display scale and for requesting a route sweep. The present device has a processor provided with software, so as to manage the display and among other things define the map portion displayed. The processor has instructions for moving the map portion displayed from a start point to a finish point.

The present guidance devices carry out a route sweep in the course of a procedure for guiding a vehicle, according to which a specified portion of a map is displayed on a screen, a display scale is chosen, and the map portion displayed is moved from a start point to a finish point.

Such a device for guiding a vehicle is known from document DE-OS 195 16 647 (B.M.W). According to this document, the map portion depicted is moved so as to follow the vehicle and the scale is magnified automatically when the speed of the vehicle is lower. However, the present device suffer from scaling problems encountered while performing the route sweep. Thus there is a need to optimize the running of a route sweep.

SUMMARY OF THE INVENTION

One embodiment of the present invention is an apparatus for guiding a vehicle, provided with a display screen on which can be displayed, among other things, a specified portion of a map, with an input and control unit among other things for choosing a display scale and for requesting a route sweep. The apparatus has a processor provided with software, so as to manage the display and among other things define the map portion displayed. The processor has instructions for moving the map portion displayed from a start point to a finish point. In order to optimize the route sweep, the software furthermore has instructions for adjusting, independently of the position of the vehicle, the rate of sweep of the map portion displayed as a function of the display scale requested at the start and of the total distance to be swept, and instructions for varying the scale as a function of the instantaneous rate of sweep.

Particularly embodiments of the apparatus include instructions for calculating the maximum so-called cruising rate desirable to obtain a short sweep time. The processor may also include instructions for, starting from a specified scale, moving the map portion at an increasing rate in such a way as to arrive at the cruising rate after a predetermined time, instructions for carrying out the central part of the sweep at the cruising rate, and instructions for terminating the sweep of the map portion while reducing the rate.

The software may also include instructions for calculating the maximum so-called cruising rate desirable to obtain a short sweep time and instructions for, starting from a specified scale, moving the map portion at an increasing rate in such a way as to arrive at the cruising rate after a predetermined time, whilst modifying the scale so as to arrive after the same time at a scale which is compatible with the cruising rate, instructions for carrying out the central part of the sweep at the cruising rate with said compatible scale, and instructions for terminating the sweep of the map portion while modifying the rate and the scale again so as to return to the initial scale.

The software may also include instructions for modifying the scale in the tiers, and for enlarging it each time that the rate undershoots a predetermined threshold. The software may also include instructions for modifying the scale progressively as a function of the rate.

The invention also relates to a process for carrying out a route sweep in the course of a procedure for guiding a vehicle, according to which a specified portion of a map is displayed on a screen, a display scale is chosen, and the map portion displayed is moved from a start point to a finish point.

According to the process of the invention, the map portion displayed is moved, independently of the position of the vehicle, at a rate which depends on the display scale requested at the start and on the distance to be swept during the sweep, and the scale is slaved continuously to the sweep rate.

The process further includes the step of calculating the maximum so-called cruising rate desired to obtain a short sweep time, starting from a specified scale. The map portion is moved at an increasing rate in such a way as to arrive at the cruising rate after a predetermined time. The central part of the sweep is then carried out at the cruising rate, and the sweep of the map portion is terminated while reducing the rate.

The map portion may be moved at an increasing rate in such a way as to arrive at the cruising rate after a predetermined time, whilst modifying the scale so as to arrive after the same time at a scale which is compatible with the cruising rate, the central part of the sweep is carried out at the cruising rat with said compatible scale, and the sweep of the map portion is terminated while modifying the rate and the scale again so as to return to the initial scale.

The software may include instructions for modifying the scale in tiers, and for enlarging it each time that the rate undershoots a predetermined threshold. The software may also include instructions for modifying the scale progressively as a function of the rate.

These aspects of the invention as well as other more detailed aspects will emerge more clearly by virtue of the following description of an embodiment constituting a non-limiting example of the invention. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

While the present invention is capable of embodiment in various forms, there is shown int he drawings and will hereinafter be described a presently preferred embodiment with the understanding that the present disclosure is to be considered as an exemplification of the invention, and is not intended to limit the invention to the specific embodiment illustrated.

Figure 1:
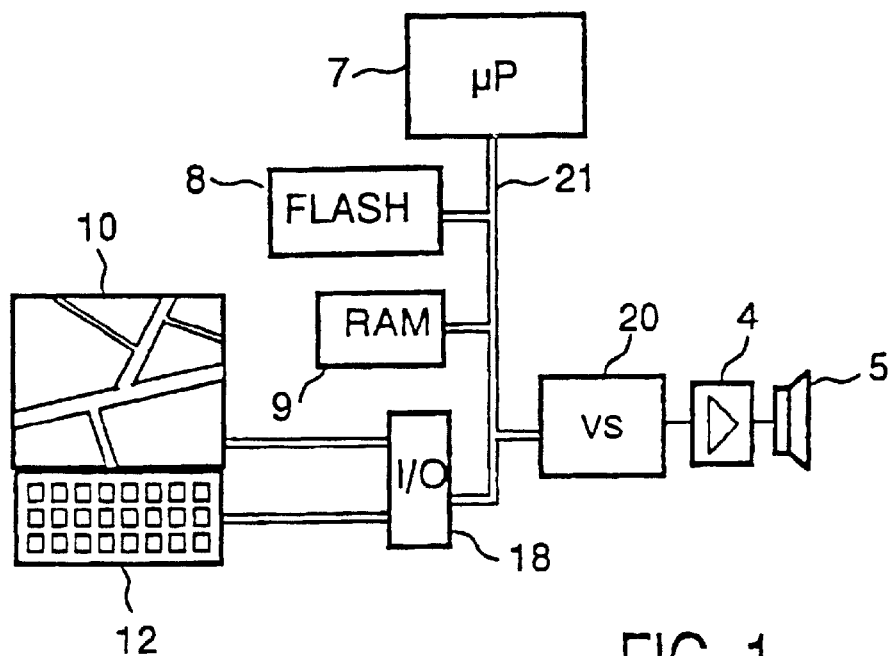
FIG. 1 diagrammatically depicts an apparatus according to the invention.

The apparatus of FIG. 1 has a processor 7 provided with software for generating monitoring signals and for processing the output signals from various devices. The various devices are linked to the processor 7 by a bus 21. The apparatus includes several memories: a so-called "RAM" volatile memory 9 for storing data valid at a given instant, and a nonvolatile memory 8, for example a "flash" type memory, and a "CD-ROM" disk drive, for storing descriptions and data which are written once. The memory 8 is designed to store, among other things, geographical data.

The apparatus has a means for informing a user, such as an audio amplifier system 4 coupled to a loudspeaker 5, to make it possible to deliver messages in voice form, and an input/output interface device 18 linked to a display screen 10. The display screen 10 may be a liquid crystal type display to make it possible to display plans or maps and messages in written form. To ensure interactivity with the user, the input/output interface 18 is linked to a control keypad 12, which constitutes an input unit for, among other things, receiving a route sweep request from a user.

The display of a video image has a fixed rate of refresh. The term "image" refers to the graphic which is constructed at each refresh, and the term "map portion" refers to a part of a geographical map depicted as an image. The fluid rendering, that is to say with no jerky motion, of a movement of a map portion when this part is shifted from one image to another, presupposes that the map portion is not moved by more than a maximum number N of pixels, so as to follow a movement on the map with good legibility. This number N is dependent on the number of images per second and on the integration time of the eye.

When it is desired to increase the rate of movement while complying with this rule, one solution is to increase the image refresh rate "v", and/or to increase the unit movement X, that is to say the quantity of pixels by which the map portion is moved from one image to another, on condition that X remains smaller than N. In any case, the maximum rate $V_{max}$, expressed as the number of pixels per second, is imposed by the relation $V_{max} \geq N/v$. It is clear that, for a given rate expressed in terms of geographical coordinates, the rate of sweep of the map portion displayed, expressed in pixels, depends on the scale.

A route sweep consists of going from an initial map portion to a final map portion. The sweep progresses in successive shifts from the initial map portion to the final map portion. The time which elapses between the commencement of the sweep and its end should be reasonably short. This relative motion depends on the distance between the start and finish points, and on the scale on which the map is represented. A scale is larger if the objects are represented larger.

If the scale remains fixed during the sweep, the movement in terms of pixels per image is limited according to the above considerations, in such a way not to exceed N, and a minimum time "t" is therefore imposed for the entire sweep and is at risk of being too long.

To solve this problem, the software of the apparatus slaves the map scale to the desired rate of sweep. The start scale is chosen by the user, and it is desirable to restore the same scale at the end of the sweep. Hence, the software calculates the maximum rate, termed the "cruising" rate, desirable to obtain a short sweep time and then, starting from a specified initial scale, moves the map portion more and more quickly (in terms of geographical coordinates) whilst reducing the scale in such a way as to arrive after a predetermined time at a scale which is compatible with the cruising rate. The scale arrived at is such that the rate, expressed as the number of pixels per second, is the maximum rate indicated above. The apparatus it then carries out the central part of the sweep at a constant rate with the compatible scale, and then terminates the sweep of the map portion while moving the map portion more and more slowly (in terms of geographical coordinates) whilst modifying the scale again so as to return to the initial scale. The scale is modified during the sweep in such a way that the rate expressed in terms of pixels remains almost constant while the rate in terms of geographical coordinates varies.

Figure 2:
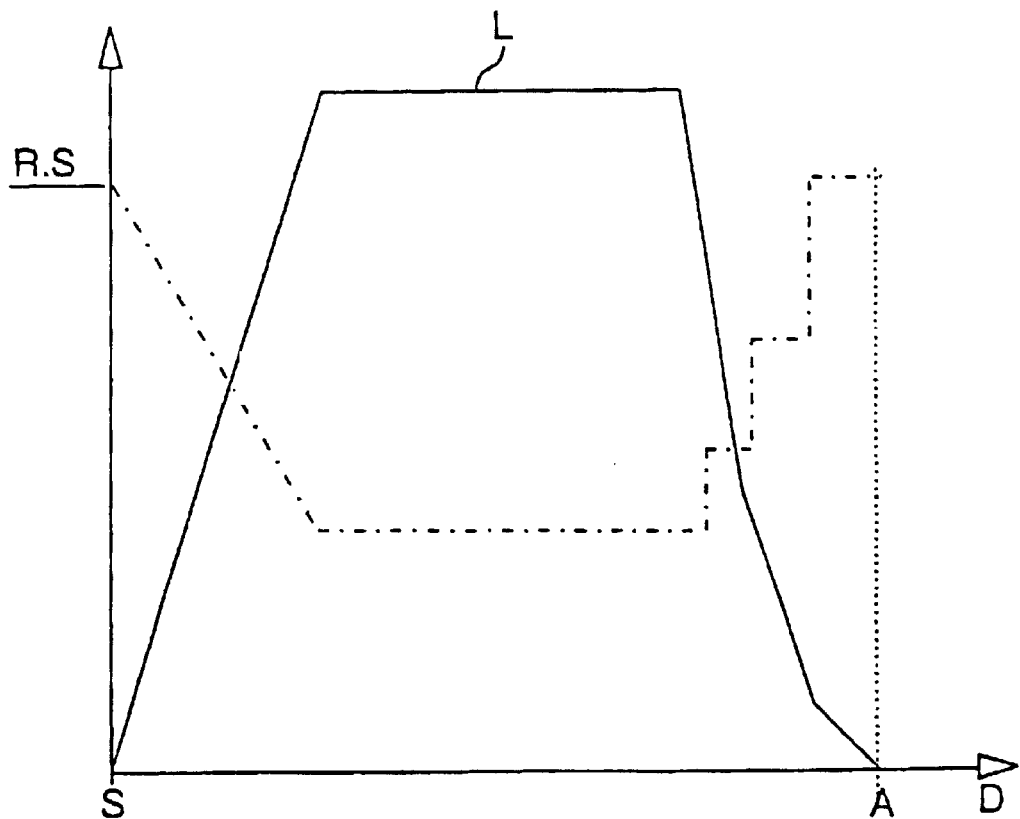
FIG. 2 illustrates the variation of the sweep rate and the scale of the map during the sweep of a route.

An example of a rate/scale pair used in this way is illustrated by FIG. 2 in which the abscissa represents the geographical position D of the center of the map portion displayed. The map portion displayed is moved from a start point S to a finish point A at the rate (in terms of geographical coordinates) indicated by the solid curve. The height of the plateau L which is reached at the maximum of this rate depends on the time taken in total by the operation for sweeping the map portion displayed from the start point to the finish point. For example, this time is indicated by the user by means of the control keypad, or else predefined in the system. The display scale is modified as indicated by the chain-dotted curve, as a function of the geographical position of the map portion displayed. The value of this scale is in particular dependent on the scale R. S requested at the start, on the distance S-A to be swept during the sweep, and on the maximum L of the rate, itself dependent on the duration requested for the operation.

The decrease in the scale, at the outset, is linear and proportional to the increase in the rate; at the end another process has been chosen, according to which the scale is modified in tiers, being enlarged each time that the rate undershoots a predetermined threshold. Each time that the scale changes, the slope of the rate curve is reduced. Of course, these curves can be modified at will: for example, the shape of the curve of the increase in the rate can be symmetric with that for the decrease, or vice versa; likewise in respect of the shape of the curve of the scale; the latter could have plateaux on both sides, or else on the contrary a proportional increase/decrease on both sides; the slopes can be greater or lesser etc.

It will be apparent to those skilled in the art that various modifications and variations can be made in the method and system of the present invention without departing from the spirit or the scope of the invention. Thus, the present invention is not limited by the foregoing descriptions but is intended to cover all modifications and variations that come within the scope of the spirit of the invention and the claims that follow.

I claim:

1. An apparatus for guiding a vehicle comprising:
   a display screen on which can be displayed a specified portion of a map;
   an input and control unit for choosing a display scale and for requesting a route sweep;
   a processor provided with software, so as to manage the display and define the map portion displayed, the software including instructions for moving the map portion displayed from a start point to a finish point defining a route; and
   wherein the software furthermore includes instructions for adjusting the rate of sweep of the map portion displayed as a function of the display scale requested at the start and of the total distance of the route between the start point and the finish point to be swept, and instructions for varying the scale continuously during the sweep as a function of the instantaneous rate of sweep, and periodically updating the display with a new map portion at the varied scale between the start point and the finish point of the route.

2. The apparatus for guiding a vehicle as claimed in claim 1, wherein the software further includes instructions for calculating the maximum so-called cruising rate desirable to obtain a short sweep time, instructions for, starting from a specified scale, moving the map portion at an increasing rate in such a way as to arrive at the cruising rate after a predetermined time, instructions for carrying out the central part of the sweep at the cruising rate, and instructions for terminating the sweep of the map portion while reducing the rate.

3. The apparatus for guiding a vehicle as claimed in claim 1, wherein the software further includes instructions for calculating the maximum so-called cruising rate desirable to obtain a short sweep time, instructions for, starting from a specified scale, moving the map portion at an increasing rate in such a way as to arrive at the cruising rate after a predetermined time, whilst modifying the scale so as to arrive after the same time at a scale which is compatible with the cruising rate, instructions for carrying out the central part of the sweep at the cruising rate with said compatible scale, and instructions for terminating the sweep of the map portion while modifying the rate and the scale again so as to return to the initial scale.

4. The apparatus for guiding a vehicle as claimed in claim 3, wherein the software further includes instructions for modifying the scale in the tiers, and for enlarging it each time that the rate undershoots a predetermined threshold.

5. The apparatus for guiding a vehicle as claimed in claim 3, wherein the software further includes instructions for modifying the scale progressively as a function of the rate.

6. A process for carrying out a route sweep in the course of guiding a vehicle, the process comprising the steps of:

displaying a specified portion of a map on a screen, choosing a display scale;

performing a route sweep by moving the map portion displayed on a route from a start point to a finish point, wherein the map portion displayed is moved, independently of the position of the vehicle on the route, at a rate which depends on the display scale requested at the start and on the distance between the start point and the finish point; and continuously slaving the scale to the sweep rate; and periodically and automatically displaying a new map portion at the scale during the entire route sweep on the route.

7. The process for guiding a vehicle as claimed in claim 6, further comprising the steps of:

calculating the maximum cruising rate desirable to obtain a short sweep time is firstly calculated;

moving the map portion is moved at an increasing rate in such a way as to arrive at the cruising rate after a predetermined time and starting from a specified scale;

carrying out the central part of the sweep at the cruising rate; and terminating the sweep of the map portion while reducing the rate.

8. The process for guiding a vehicle as claimed in claim 6, further comprising the steps of:

calculating the maximum cruising rate desirable to obtain a short sweep time;

moving the map portion at an increasing rate in such a way as to arrive at the cruising rate after a predetermined time;

modifying the scale so as to arrive after the same time at a scale which is compatible with the cruising rate;

carrying out the central part of the sweep at the cruising rate with said compatible scale; and terminating the sweep of the map portion while modifying the rate and the scale again so as to return to the initial scale.

9. The process for guiding a vehicle as claimed in claim 8, further comprising the step of modifying the scale in tiers, and enlarging it each time that the rate undershoots a predetermined threshold.

10. The process for guiding a vehicle as claimed in claim 8, further comprising the step of modifying the scale progressively as a function of the rate.

* * * * *